United States Patent [19]

Preskitt et al.

[11] 4,227,198

[45] Oct. 7, 1980

[54] SEISMIC TRIGGERED SEISMOGRAPH

[75] Inventors: Stanley V. Preskitt, Dallas; Larry R. Cornelius, Quinlan, both of Tex.

[73] Assignee: Dallas Instruments, Dallas, Tex.

[21] Appl. No.: 271

[22] Filed: Jan. 2, 1979

[51] Int. Cl.$^2$ .............................................. G01D 9/00
[52] U.S. Cl. ................................. 346/1.1; 346/33 C; 367/68
[58] Field of Search ..................... 346/7, 44, 112, 115, 346/1, 33 C; 367/68

[56] References Cited

U.S. PATENT DOCUMENTS

| | | | |
|---|---|---|---|
| 1,438,462 | 12/1922 | Palmgren . | |
| 2,578,803 | 12/1951 | Holmberg et al. | 346/7 |
| 3,344,881 | 10/1967 | White . | |
| 3,603,140 | 9/1971 | Spencer . | |
| 3,872,478 | 3/1975 | Lucole | 346/7 |

OTHER PUBLICATIONS

Brochure for Model S5 Vibration Monitor, Slope Indicator Co., 3668 Albion Place North, Seattle, Washington 98103.
Brochure for Digital Event Recorder Model DR-100, W. F. Sprengnether Instrument Co., Inc., 4567 Swan Avenue, St. Louis, Missouri 63110.

*Primary Examiner*—George H. Miller, Jr.
*Attorney, Agent, or Firm*—Richards, Harris & Medlock

[57] ABSTRACT

A seismic triggered seismograph (10) has a transducer (12) that measures particle vibration along three orthogonal axes and a microphone (14) which measures atmospheric overpressure. The four parameters measured produce signals which are passed through delay circuits (58, 60, 62, 90) and then connected for recording on magnetic tape (21). The seismic signals are examined before being input to the delay circuits (58, 60, 62) and when any of the signals exceeds a predetermined threshold, a tape transport (154) and recording mechanism are activated so that the signals are recorded when they emerge from the delay circuits. Both the delay circuits (58, 60, 62, 90) and the magnetic recording are implemented with analog format. At the end of a predetermined time interval following a seismic event, a calibration signal is applied to the magnetic recording. Following the calibration signal, the transducer (12) is activated by a standard amplitude signal for indicating calibration of the transducer (12). The atmospheric overpressure signal channel has written thereon following the calibration signals a digital summary of data related to the triggering signal, including the peak seismic event detected by the transducer (12) and the maximum atmospheric overpressure measured by the microphone (14).

16 Claims, 5 Drawing Figures

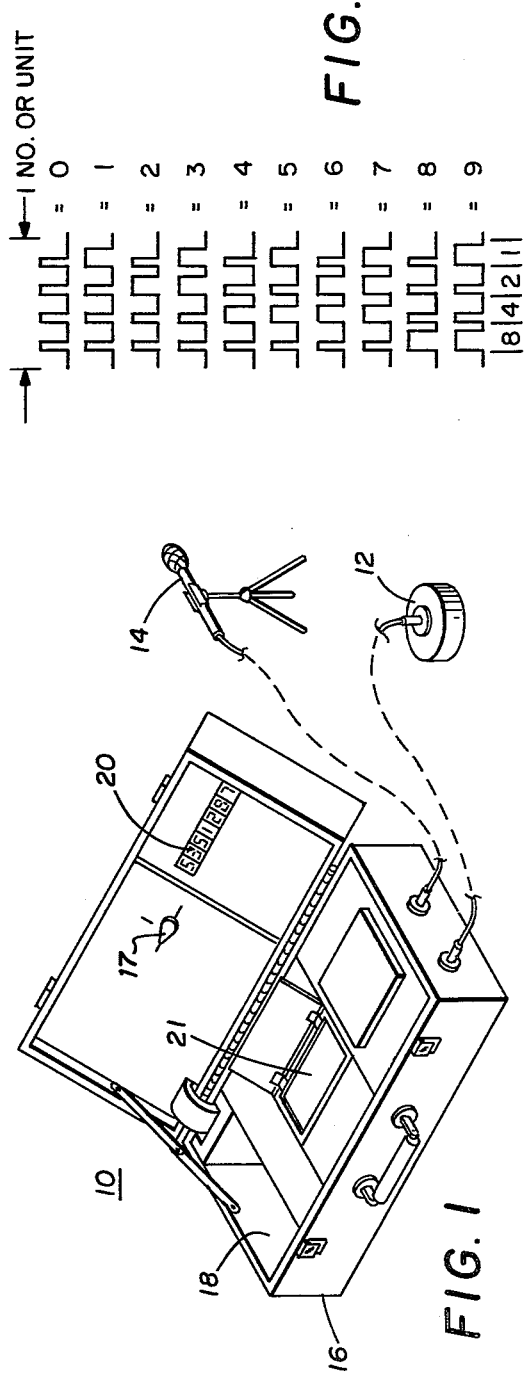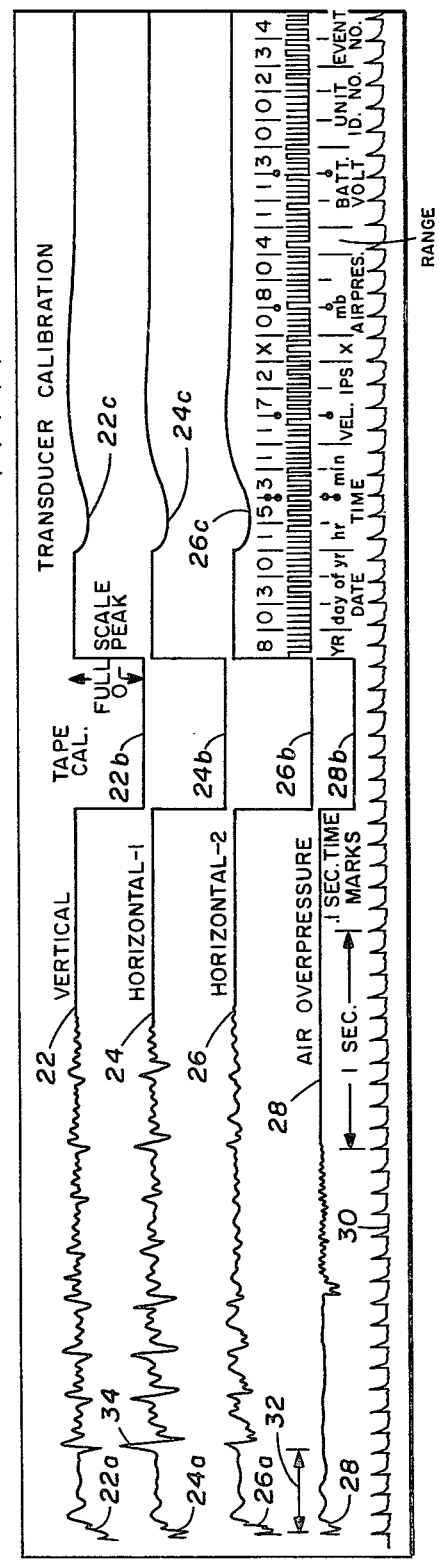

SEISMIC TRIGGERED SEISMOGRAPH

TECHNICAL FIELD

The present invention pertains to seismic equipment and more particularly to equipment for measuring seismic events and recording the resulting signals in both analog and digital formats.

BACKGROUND ART

The construction and mining industries make extensive use of explosives in areas increasingly close to existing structures. The power generated by the explosives can have a detrimental effect on business and residential structures and even at lesser levels can cause human discomfort. However, many projects require the use of large explosive charges in order to be economically feasible. Therefore, the extent of vibrations generated due to the explosions must be carefully measured and monitored to insure that the limit of structural damage is not reached but that needlessly small charges are not being used.

A number of seismic monitoring devices have been developed to measure the energy of vibrations generated by explosive charges. An example of such a device is the three-dimensional seismograph disclosed in U.S. Pat. No. 3,872,478 to Lucole. Further seismic recorders are shown in U.S. Pat. Nos. 3,603,140; 2,578,803 and 1,438,462.

The above devices do not fully satisfy the requirements of the mining and construction industries and there exists a need for a seismic recorder which can be operated in a remote location for extended periods of time while recording only seismic events which exceed a predetermined threshold.

In addition, the need exists for a recorder wherein the seismic and acoustic information is recorded in an analog format for detailed engineering analysis which is followed by a recording in a digital format of the summary data attendant to the event, including the year, the day of the year, the hour and minute of the day, the peak particle velocity of the seismic motion, the peak air overpressure, the recording range of seismic data, the internal battery voltage, the instrument identification number, and the event number of the recording. The summary data should be recorded in a digital format to permit automatic processing of the records by computer for fast, accurate and low cost recovery of the key recorded data by inexperienced personnel.

BRIEF DESCRIPTION OF DRAWINGS

For a more complete understanding of the present invention and the advantages thereof, reference is now made to the following description taken in conjunction with the accompanying drawings in which:

FIG. 1 is a perspective view of a seismic triggered seismograph in accordance with the present invention, FIG. 2 is an illustration of a strip chart recording of analog seismic and acoustic signals and the digitized summary of the event data, FIG. 3 is an illustration of the digital code used in the summary data recording.

DETAILED DESCRIPTION OF THE INVENTION

Figure 4:
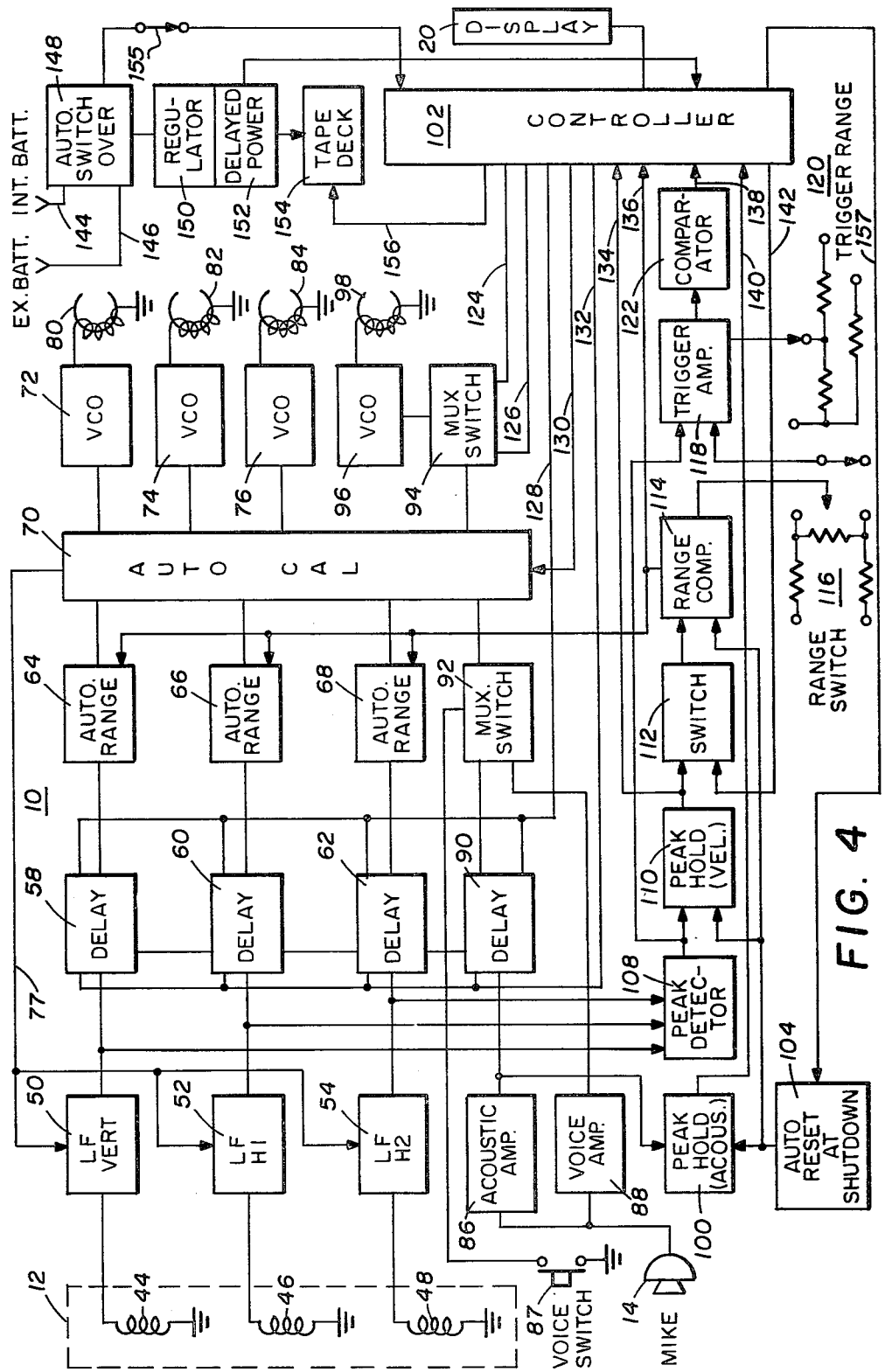
FIG. 4 is a block schematic diagram of the seismic triggered seismograph of the present invention.

FIG. 1 illustrates a seismic triggered seismograph shown generally as 10, having connected thereto a seismic transducer 12 and a microphone 14. The seismograph 10 is contained within a housing 16 having a compartment 18 for storage of the transducer 12, microphone 14 and associated cabling. A digital display panel 20 is mounted on the interior of the lid of container 16. A three position switch 17 is located adjacent display 20 for selecting the parameters presented by the display.

The transducer 12 has three seismic sensors mounted to measure seismic vibrations along three mutually orthogonal axes. These three sensors thus measure the components of a seismic event which are propagated to the point of measurement.

The seismograph 10 includes a tape transport therein for recording signals onto a cassette 21. The analog seismic signals received by the transducer 12 and the air shock wave detected by microphone 14 are recorded on cassette 21 after being delayed for a fixed time period. The time delay is included to permit the complete recording of all seismic events which exceed a preset threshold. Following each of the seismic events, a digital signal is recorded on the cassette to indicate the peak particle velocity which was measured by the transducer 12, the air overpressure, and other information included as summary data. The display 20 also shows the magnitude of all summary data recorded during the last event, the information being selected by manipulation of switch 17.

In operation, the seismograph 10 is deployed in the vicinity of blasting or high noise operations. The transducer 12 is coupled to or buried in the ground and the microphone 14 is mounted on a stand to measure air overpressure. The date and time is entered into the seismograph 10 and is maintained current by an internal clock. The signals received from the transducer 12 and microphone 14 are delayed for a period of approximately one-half second. The signals not delayed are examined directly and are compared to the preset threshold. If any one of the direct incoming signals exceeds the threshold, the tape transport within the seismograph 10 is activated and the signals passing through the delay are recorded on the cassette 21. By means of the delay, the entire activating signal is recorded despite the inherent delay in starting the tape transport mechanism. The seismograph 10 records the signals from transducer 12 and microphone 14 in analog format on the cassette 21 for a fixed period of time after the signals drop below the present trigger threshold level. At the end of this period of time, an automatic calibration procedure is initiated and a digital summary of the data is recorded on the cassette tape. The digital section of the recording includes the peak values of the event, the time of occurrence of the event, the air pressure at the time of occurrence, along with a number of other parameters.

Referring to FIG. 2 which illustrates a strip chart record of the signal recorded on cassette 21 by seismograph 10, there are shown five traces. Trace 22 at the top of the chart shows the vertical particle velocity measured by the transducer 12. Trace 24 shows the first of two horizontal velocities, while trace 26 shows the second of the horizontal velocities. The vertical and two horizontal traces represent three mutually orthogonal axes.

Trace 28 measures the air overpressure as sensed by the microphone 14. The lowest line on the chart, trace 30, is a time scale with each division representing one tenth of a second, and is provided by the playback recorder, not the seismograph record.

The seismograph 10 delays each of the signals being recorded on traces 22–28 so that a trigger circuit may activate the tape transport mechanism. The initial curves 22a–28a on each trace 22–28 are transients produced due to the startup of the tape mechanism. The arrow 32 indicates the duration of the delay period before the triggering signal 34 is recorded on the cassette.

The tape transport in the seismograph 10 is activated to record all of the tracks when a signal of sufficient amplitude is received on at least one of the input channels. As shown in FIG. 2, the trigger signal 34 is of sufficient amplitude to activate the tape transport mechanism. The channels once activated are thus recorded in parallel time sequence.

After a set interval of time has passed following the decay of the seismic signal below the trigger threshold level, a tape calibration signal shown as 22b–28b is recorded on the tape to indicate signal amplitude. Following the calibration signal, the three sensor elements in the transducer 12 are activated to produce the transducer calibration signals indicated as 22c–26c. Unlike the seismic sensor signals, the air overpressure signal channel shown on trace 28 is encoded with a digital summary of the data recorded during the event. This information is encoded in binary form to represent decimal data as shown in FIG. 3.

The binary coded data summary indicates the last digit of the year in the first slot, the day of year in the next three slots, the hours and minutes of the time of the event in the next four slots, the actual peak velocity in inches per second in the next three slots, while the next following slot is not used. The immediate following three slots show the air overpressure as measured in millibars, the next slot showing the range of the recorded seismic data, the succeeding three slots showing the battery voltage of the seismograph, the next three slots being a unit identification number, and the last two slots showing the number of the event which was recorded.

A tape recording as reproduced and shown in FIG. 2 is made for each event which has an amplitude that exceeds the predetermined threshold. Since only a short section of tape is used for each event and the tape is not operated until an event is detected, a great number of events may be recorded on a single cassette tape.

Referring now to FIG. 4, the seismograph 10 is shown in a block diagram form illustrating each of the functional units thereof. The transducer 12 contains three individual sensor elements 44, 46 and 48 with each of the elements disposed along one of three orthogonal axes. Element 44 is oriented in the vertical direction, 46 in a first horizontal direction and 48 in a second horizontal direction. The signals produced by the sensor elements are provided to the input terminal of low frequency amplifiers 50–54, respectively.

Following the low frequency amplifiers, the signals from the sensors are passed through delay circuits 58, 60 and 62. From the delay circuits, the sensor signals are input to automatic range circuits 64, 66 and 68. Each of the range circuits 64, 66 and 68 is an amplifier having a plurality of stepped gain settings. The amplifiers are set to gain values which provide the optimum scale factor for the recorded seismic signals. The calibration signal described above is provided by the automatic calibration circuit 70 which also interconnects the automatic ranging circuits to voltage control oscillators 72, 74 and 76. The voltage control oscillators are modulated by the sensor signals and the modulated signals thus produced are recorded on cassette 21 by means of tape heads 80, 82 and 84.

The microphone 14 is connected to an acoustic amplifier 86 as well as to a voice amplifier 88. The microphone 14 measures the overpressure of the air caused by an explosive blast or noise source and generates a signal therefrom. This signal is passed through the acoustic amplifier 86 and through a delay circuit 90 to a multiplex switch 92. Switch 92 selectively connects one of two inputs to the automatic calibration circuit 70 which in turn transfers the acoustic signal to a multiplex switch 94. This switch conveys the acoustic overpressure signal generated by the microphone 14 to a voltage control oscillator 96 which generates a signal that is recorded on the cassette 21 by a tape head 98.

The output of the acoustic amplifier 86 is also provided to a peak hold circuit 100 which provides the peak acoustic signal value to a controller circuit 102. A reset circuit 104 is operated by controller 102 to reset the peak hold circuit 100.

The output signals of each of the low frequency amplifiers 50, 52 and 54 are provided to a peak detector circuit 108 which selects the peak amplitude signal from among the multiple inputs. A peak hold circuit 110 receives the output of the peak detector circuit 108 and latches to the peak value produced therefrom. The peak value thus produced is transferred through a switch 112 to a range computing circuit 114 which adjusts the range levels of the range circuits 64, 66 and 68. Circuit 114 measures the amplitude of the peak value signal received and selects the gain of ranging circuits 64, 66 and 68 to provide the maximum scale reading possible without exceeding the limits of the voltage controlled oscillators 72, 74 and 76. A manual range selection circuit 116 permits the operator to select the desired range in place of determining the range on the basis of the signal amplitudes.

The output of the detector circuit 108 is also provided to a trigger amplifier circuit 118. This circuit determines if the seismic signals exceed the threshold which is required to activate the seismograph recorder. The threshold is selected by a trigger range circuit 120. The output of the trigger amplifier circuit 118 is passed through a comparator 122 and then to the controller 102.

The controller 102, which is described in further detail below, generates various clocking and control signals for a number of other elements in the seismograph 10. A control signal is provided on line 124 for operating the multiplex switch 94. The digital summary code is transmitted on line 126 through the switch 94 for recording on the cassette tape. A clocking signal is provided on line 128 to the delay circuits 58, 60, 62 and 90. The calibration circuit 70 is driven by controller 102 over line 130. A second clocking signal is provided by the controller 102 through line 132 to the delay circuits 58, 60, 62 and 90. The output of the peak hold circuit 110 is transmitted over line 134 to the controller 102. The output of the range computing circuit 114 is transmitted over line 136 to the controller 102. Comparator 122 is connected through line 138 to the controller 102. The acoustic peak sample generated by the peak hold circuit 100 is transmitted through line 140 to the controller 102. Switch 112 is activated by controller 102 through a command set on line 142.

The seismograph 10 can be powered by either an internal battery connected to line 144 or an external battery connected to line 146. These lines are connected through an automatic switchover circuit 148 which selects either the internal or external battery as a power source. The power source that is selected is connected to a voltage regulator 150 and a delay power circuit 152. A tape deck 154 having the tape transport mechanism previously described is powered by a line connection to the delay power circuit 152. Circuit elements which must be powered at all times, such as the clock are connected directly to the automatic switchover circuit 148 through switch 155, but elements which operate only when the seismograph is recording are connected to the delayed power circuit 152 which is activated when a seismic signal exceeds the preset threshold. A control line 156 from the controller 102 operates the tape deck 154. A reset command is generated by controller 102 and transmitted through line 157 to reset circuit 104.

When there is a seismic event generated for example by an explosion, construction or transportation activity, the sensor elements 44-48 will be activated to generate signals which are transferred to the corresponding low frequency amplifiers. The signals thus generated are amplified and transferred to the input terminal of the delay circuits which, in the present embodiment, are charge coupled devices providing a delay period of one-half second. The output signals of the low frequency amplifiers are provided without a delay to the peak detector circuit 108. The signals in the detector circuit are rectified to produce a peak voltage. This voltage is then amplified by the trigger amplifier 118 and examined to determine if the peak voltage exceeds the preset threshold level. Each time the threshold is exceeded, the trigger amplifier 118 generates a pulse which is transmitted to comparator 122 which provides a run signal to controller 102 indicating that the seismic and acoustical signals are to be recorded. If the threshold is exceeded, the tape deck 154 is activated and the incoming signals are recorded. Since the signal that generated the trigger signal is not delayed, the original signals will not yet have passed through the delay circuits 58, 60, 62 and 90. The tape transport will thus be running to record the delayed signals when they arrive at the tape heads.

The peak voltage generated by the peak detector circuit 108 is captured by the peak hold circuit 110 and transferred through switch 112 to the range computing circuit 114. This circuit determines whether the incoming seismic signals should be recorded on a greater or lesser range scale. In an exemplary embodiment, the auto ranging circuits 64, 66 and 68 select between one of two scales having maximum values of one inch per second (IPS) and four IPS. The range computing circuit 114 then sets each of the range circuits to the desired level. Each of the circuits is set to the same level depending upon the one peak value received. The seismic signals thus appropriately ranged are transferred through the calibration circuit 70 which is activated only after completion of the seismic event. The seismic signals are utilized to modulate voltage controlled oscillators 72, 74 and 76 which apply a varying frequency audio signal to the cassette tape. Thus, the seismic signal is recorded on the tape in a frequency modulated format.

At the end of a predetermined time interval following the reduction of the seismic signals to less than the preset threshold, the automatic calibration circuit 70 is activated to apply a full scale reading to the voltage control oscillators and effect maximum deviation of the signal on the cassette tape to show a full scale reading. This is shown as signals 22b-28b in FIG. 2. After the operation of the calibration circuit 70, the sensor elements 44, 46 and 48 are activated with a standard amplitude signal to cause a response to show that the sensors are properly calibrated. The calibration signal is transmitted through line 77 to low frequency amplifiers 50, 52 and 54 which in turn activate sensors 44, 46 and 48. The sensor is deflected and then released with the resulting signal indicating sensor calibration. This calibration is shown as deflections 22c-26c in FIG. 2.

The air overpressure as measured by the microphone 14 produces a signal which is delayed in the delay circuit 90 and recorded by modulating voltage controlled oscillator 96. Automatic ranging is not provided for the air overpressure signal. The voice switch 87 is provided to activate switch 92 for connecting the output of the voice amplifier 88 to be recorded on the cassette tape. This permits the operator to add verbal comments during attended operations.

At the end of the calibration operations, a digital code summary is written on the channel which records the air overpressure signal. This is done during the time the sensor elements are being calibrated. The digital summary is generated by the controller 102 and transmitted over line 124 to switch 94 which connects line 124 to voltage controlled oscillator 96. The digital code signal indicates the value of the peak seismic signal and peak air overpressure measured during the immediately preceding event. These are the peak values which were retained in controller 102. Numerous operational parameters are provided as well, including a date-time group and other information as described above.

Figure 5:
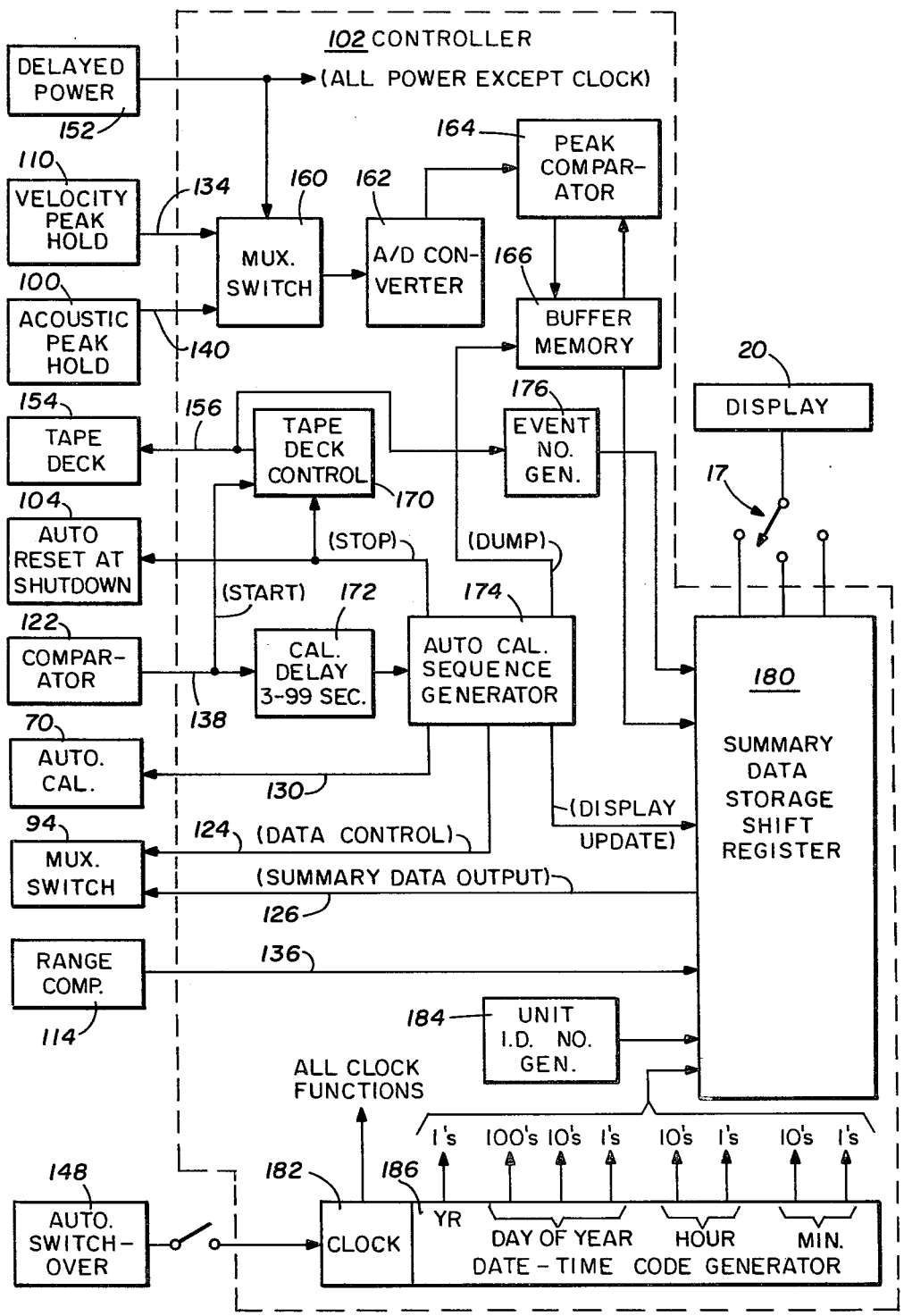
FIG. 5 is a block diagram of the state controller shown in FIG. 4 and used for automatic operation and generation of the digital summary data.

The controller 102 shown in FIG. 4 is illustrated in block diagram form in FIG. 5. The acoustic peak hold circuit 100 and the seismic velocity decode circuit 110 detect and latch to a peak value until being reset. The peak holding circuits are reset periodically during the seismic event so that a series of peak values are produced. These peak values are transmitted through lines 134 and 140 to a multiplex switch 160 which alternately connects each of the peak hole circuits and the power supply line to an analog to digital (A/D) converter 162. Within converter 162, the analog signals are measured and a digital representation of the signal amplitude is generated. The peak values for the acoustic and seismic signals are stored in a buffer memory 166. The peak comparator 164 compares the incoming peak value with the existing value stored in the buffer memory 166, and if the incoming value is greater than that previously stored, the new value is placed in the buffer memory. But, if the incoming value is less than that stored in the buffer memory, the incoming value is discarded.

The comparator 122 generates a start signal which is transmitted over line 138 to a tape deck control circuit 170 which controls tape deck 154 through line 156. Therefore, when a seismic signal exceeds the predetermined threshold, the comparator 122 generates a start signal which activates tape control circuit 170, which in turn causes tape deck 154 to begin recording. The start signal from comparator 122 is also provided to a calibration delay circuit 172 which starts a counter when the start signal is terminated. The length of the time interval is preselected by the operator. At the end of the preselected time interval the calibration delay circuit 172 provides a signal to the automatic calibration sequence generator 174. After the calibration signals, as described above, have been recorded along with the digital data summary, the sequence generator 174 generates a stop signal which is transmitted to the tape deck control unit 170 to terminate operation of tape deck 154. The stop signal is also transmitted to the automatic reset shutdown circuit 104 which resets peak hold circuits 100 and 110, as well as the range computing circuit 114.

Each time the tape deck 154 is activated, the signal generated on line 156 is monitored by an event number generator circuit 176. Circuit 176 functions as a counter which is incremented by one step each time the tape deck 154 is activated. The signals stored in the counter are transferred to a summary data storage shift register 180 where the event number is stored in a preselected location.

The automatic calibration sequence generator 174 is a circuit which generates command signals after certain numbers of clock periods have passed following receipt of an input signal. Sequence generator circuit 174, as well as the other clock operations in the seimograph 10, are operated by a clock 182. The automatic calibration circuit 70 is activated at a predetermined time by the sequence generator 174 after the seismic signals have dropped below the predetermined threshold.

At a fixed time following the termination of the seismic signals as indicated by the calibration delay circuit 172, the sequence generator 174 commands multiplex switch 94 over line 124 to switch the output from the acoustic signal to the data summary signal on line 126 generated by summary data storage shift register 180. The activation of multiplex switch 94 thus permits the digital summary data to be recorded by tape head 98 onto the cassette 21 in place of the acoustic presure signal.

The state of the range computing circuit 114, in either a one IPS or four IPS position, is indicated over line 136 to the summary data storage shift register 180. This parameter is likewise stored in the shift register in a predetermined location. A unit identification number generator 184 produces a fixed three digit number for each separate seismograph unit 10. This number is likewise stored in the summary data storage shift register 180 in a predetermined location.

Clock 182 drives a date-time code generator 186 which generates a date-time code comprising the last digit of the year, day of year, hour and minute time reading. This continuously incremented code is provided to the summary data storage shift register 180 and is recorded therein to determine the time of occurrence of a seismic or noise event.

Following the calibration operations described above, which are initiated by the calibration delay circuit 172, the automatic calibration sequence generator commands the buffer memory 166 to transfer the contents therein into summary data storage shift register 180. As with the other parameters provided to this shift register, the buffer memory values for the peak seismic velocity and peak acoustic velocity are stored in predetermined location within the register 180.

After the initiation of the event, as indicated by comparator 122, the automatic calibration sequence generator 174 generates a periodic update signal which is provided to the summary data storage shift register 180 to cause the contents therein to be transferred to a display shift register 190 through line 182 so that the contents therein can be shown to the operator through the display 20. This update signal is provided in this embodiment at a one second interval until the calibration procedure begins.

The display 20 cannot display to the operator all of the contents of summary data storage shift register 180. The contents of this register are divided into three segments which are selectively displayed by the positioning of switch 17. By moving the switch 17 to each of the three positions, the operator may examine the entire contents of the summary data storage shift register 180.

The delay circuits 58, 60, 62 and 90 used in the present invention are a model SAD-1024 dual analog delay line manufactured by Reticon Corporation, 9110 Benicia Avenue, Sunnyvale, Calif. The SAD-1024 is a dual 512-stage bucket brigade device.

In summary, the present invention is a seismic triggered seismograph which utilizes an analog delay line to record seismic events after the recorder therein is triggered by the seismic event. The seismic signals are recorded in an analog format which is followed by calibration signals and a digital summary of the maximum particle velocity and air overpressure measured in the previous event.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

We claims:

1. A seismic triggered seismograph comprising in combination:
    (a) means responsive to onset of earth vibrations to record three orthogonal components of earth movement on analog side-by-side magnetic traces, and simultaneously to record an analog representation of concomitant sound traveling through the air as an additional trace, and
    (b) means operable upon cessation of said earth vibrations to record at least one of said traces a sequence of numerical data values related to said earth vibrations.

2. A seismic triggered seismograph as recited in claim 1 wherein said numerical data values include the peak value of said earth vibrations and of said sound.

3. A recording system triggered by the start of an event measured by a transducer which produces an electrical signal in response to the event comprising in combination:
    (a) means for recording said electrical signal and at least one additional signal related to said event, said signals recorded in analog form on side-by-side magnetic traces, and
    (b) means operable upon cessation of said event to record on at least one of said traces a numerical summary of values of said signals measured during said event.

4. A seismic triggered seismograph comprising in combination:
    (a) means for generating seismic signals in response to earth vibrations,
    (b) analog means for time delaying said seismic signals, (c) means responsive to said seismic signals for activating an analog recorder to record said time delayed seismic signals when at least one of said seismic signals exceeds a preset threshold amplitude, (d) means for terminating records of said seismic signals by said analog recorder after a predetermined time interval has elapsed following the last seismic signal which exceeds said threshold amplitude, (e) means for generating a set of numerical data values related to said earth vibrations including the peak value of said seismic signals, and (f) means for recording said numerical data values by said analog data recorder.

5. A seismic triggered seismograph according to claim 4 wherein said analog means for time delaying said seismic signals is a charge coupled device.

6. A seismic triggered seismograph according to claim 4 further including clock means for generating a time of occurrance signal for said earth vibrations.

7. A seismic triggered seismograph according to claim 4 further including means responsive to said seismic signals for automatically selecting one of a plurality of range scales for the recording of said seismic signals.

8. A seismic triggered seismograph according to claim 4 further including means for automatically generating a signal to calibrate said analog recorder after recording said seismic signals.

9. A seismic triggered seismograph according to claim 4 wherein said means for generating seismic signals comprises three transducer sensors aligned on orthogonal axes.

10. A seismic triggered seismograph according to claim 9 further including means for automatically checking the calibration of said transducer sensors after recording the seismic signals.

11. A seismic triggered seismograph comprising in combination:

(a) means for generating seismic signals in response to earth vibrations, (b) analog means for time delaying said seismic signals, (c) means responsive to said seismic signals for activating an analog recorder to record said time delayed seismic signals when at least one of said seismic signals exceeds a preset threshold amplitude, (d) means for terminating recording of said seismic signals by said analog recorder after a predetermined time interval has elapsed following the last seismic signal which exceeds said threshold amplitude, (e) means for generating a set of numerical data values related to said earth vibrations including the peak value of said seismic signals, (f) means for recording said numerical data values by said analog data recorder, (g) means for generating a pressure signal in response to air pressure, and (h) means for recording said pressure signal by said analog recorder.

12. A method for monitoring earth and air vibrations generated by events such as explosive blasts, construction or transportation activity comprising the steps of:

(a) detecting earth vibrations in three dimensions, (b) detecting air vibrations, (c) recording waveforms representing said earth and air vibrations after one of said earth vibrations exceeds a preset threshold, (d) measuring the amplitude of said earth and air vibrations and storing the maximum values thereof, (e) terminating recording of said waveforms after the amplitude of said earth vibrations becomes less than said preset threshold, and (f) recording said stored maximum values after said waveform recording has terminated.

13. A method for monitoring earth and air vibrations as recited in claim 12 further including the step of time delaying said waveforms before recording thereof.

14. A method for monitoring earth and air vibrations as recited in claim 12 further including the step of recording the time of occurrence of each of said events.

15. A method for monitoring earth and air vibrations as recited in claim 12 further including the step of recording a waveform to indicate the calibration condition of sensors used for detecting earth vibrations.

16. A method for monitoring earth and air vibrations as recited in claim 12 further including the step of selecting one of a plurality of range scales for recording of said waveforms.

* * * * *

UNITED STATES PATENT AND TRADEMARK OFFICE
CERTIFICATE OF CORRECTION

PATENT NO. : 4,227,198
DATED : October 7, 1980
INVENTOR(S) : Stanley V. Preskitt and Larry R. Cornelius It is certified that error appears in the above-identified patent and that said Letters Patent are hereby corrected as shown below:

In "References Cited", under "Other Publications", the following should be included:

--Brochure for Models S2, S3, S4 and S5, Vibration Monitors, Slope Indicator Co., 3668 Albion Place North, Seattle, Washington 98103--.

Column 8, line 35, "We claims:" should be --We claim:--.

Signed and Sealed this

Thirteenth Day of January 1981

[SEAL]

Attest:

SIDNEY A. DIAMOND

Attesting Officer

Commissioner of Patents and Trademarks